C. OFFNER.
LOCKING WASHER.
APPLICATION FILED JAN. 18, 1919.

1,341,279. Patented May 25, 1920.

Inventor:
Charles Offner.
by his Attorney:

UNITED STATES PATENT OFFICE.

CHARLES OFFNER, OF LYON, FRANCE.

LOCKING-WASHER.

1,341,279. Specification of Letters Patent. Patented May 25, 1920.

Application filed January 18, 1919. Serial No. 271,909.

*To all whom it may concern:*

Be it known that I, CHARLES OFFNER, a citizen of the French Republic, and a resident of Lyon, France, have invented certain new and useful Improvements in Locking-Washers, of which the following is a specification.

This invention consists in a locking washer adapted to be interposed, like ordinary washers, between the nut and the base against which the nut is to be screwed up and to secure the nut from being loosened by any accidental causes, such as vibrations, shocks, etc., but to allow of said nut being loosened by exerting a sufficient effort by means of a wrench.

Figure 1:
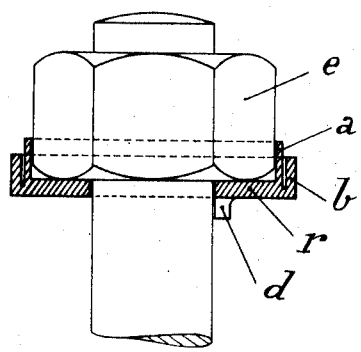
Figure 3:
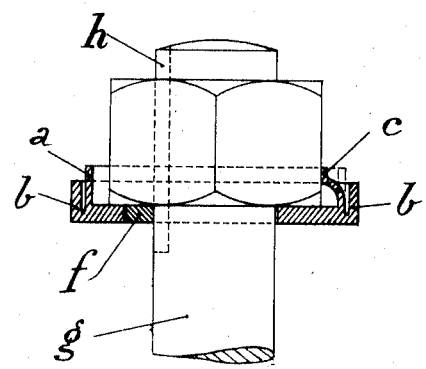
Figure 2:
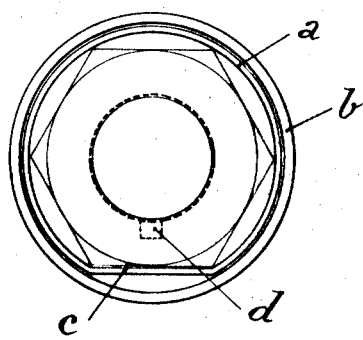
Figure 4:
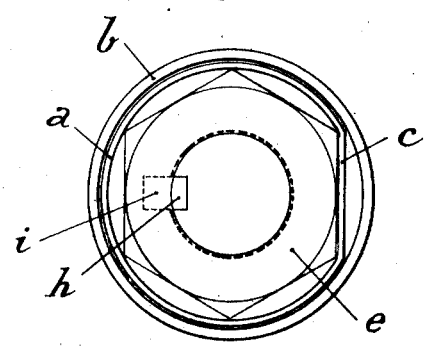

The appended drawing illustrates the practical construction of the invention. Figures 1 and 2 show one type of washer in section and in plan respectively. Figs. 3 and 4 are similar views of a modification.

The washer $r$ has its edge raised at right angles to form a collar, this collar being double, that is to say, that it is composed of two annular crowns $a$, $b$. The inner crown $a$ has a height greater than that of the outer crown $b$ and the two crowns are formed close together so as to touch each other.

This washer can be obtained in different ways. It can be cut out of a rimless metal disk or stamped up with a single rim at right angles, which is then circularly grooved at half its thickness to form the two crowns $a$, $b$.

A similar design would be obtained by means of two stamped out washers of dimensions required for fitting one in the other, then the bottoms are afterward soldered or welded electrically or autogeneously. It would also be possible to stamp out a disk of given diameter and make only the inner crown $a$ project, leaving a flat edge outside this crown, then this edge could afterward be turned up against the said crown $a$ to form the outer second crown $b$.

The diameter of the washer is determined in order that the inner diameter of the inner crown $a$ may be slightly greater than that of the nut, so that the latter can turn freely inside the washer at the time of the putting in place, as is represented by the drawing.

This ringed washer is placed like an ordinary washer and the nut $e$ is also screwed up in the usual way.

When the nut has been screwed up tight, one or more parts of the crown $a$ are bent inward against the nut, as is represented at $c$ in section in Fig. 3, and in plan in Figs. 4 and 2.

It is desirable that the washer be held against rotation. This result can be obtained by causing the washer to engage the base, either by means of a lug $d$ Fig. 1 on the washer $r$ engaging in a recess or like shape provided in the surface of the base, or by employing a key $f$ engaging at the same time in a groove $h$ provided along the stem $g$ of the bolt and in a notch $i$ provided in the washer $r$, or by any other means according to the nature and arrangement of the parts to be tightened.

With washers as previously disposed employing only one annular crown, the turning inward tends to produce irregular distortions which injure the solidity and appearance of the washer. The double ring on the contrary increases the solidity of the washer after the turning inward of one portion or of the whole circumference of the inner crown $a$: this turning inward, which is only effected on the upper part of this crown tends to force the base of the said crown $a$ outwardly, and in this invention this tendency is met by the pressure of the lower edge of the crown against the crown $b$, which consequently strengthens the inner crown at the angle between the base of the washer and its turned-in edge. Moreover, this double ring gives the washer a graceful appearance and preserves its external mechanical shape.

The difference in the height of the two crowns $a$, $b$ can be varied and will depend on the dimensions of the nut and of the application.

What I claim as my invention and desire to secure by Letters Patent of the United States is:—

1. A washer having a turned up edge divided into two concentric rings.

2. A washer having a turned up edge divided into two concentric rings, the said rings touching each other.

3. A washer having a turned up edge divided into two concentric rings, these rings being of different heights, the inner ring projecting above the outer one.

4. A washer having a turned up edge divided into two concentric rings, the said washer being provided with means for preventing its rotation on the base to which it is applied.

5. A washer having a turned up edge divided into two concentric rings, the said rings touching each other, the said washer being provided with means for preventing its rotation on the base to which it is applied.

6. A washer having a turned up edge divided into two concentric rings, these rings being of different heights the inner ring projecting above the outer one, the said washer being provided with means for preventing its rotation on the base to which it is applied.

In witness whereof I have signed this specification in the presence of two witnesses.

CHARLES OFFNER.

Witnesses:
GASTON JEANNIAUX,
MARIN GACHON.